United States Patent
Yang et al.

(10) Patent No.: US 8,593,833 B2
(45) Date of Patent: Nov. 26, 2013

(54) METHOD AND APPARATUS FOR A FLYBACK POWER CONVERTER PROVIDING OUTPUT VOLTAGE AND CURRENT REGULATION WITHOUT INPUT CAPACITOR

(75) Inventors: Ta-Yung Yang, Milpitas, CA (US); Li Lin, Taipei (TW)

(73) Assignee: System General Corp., Taipei Hsien (TW)

( * ) Notice: Subject to any disclaimer, the term of this patent is extended or adjusted under 35 U.S.C. 154(b) by 203 days.

(21) Appl. No.: 13/013,100

(22) Filed: Jan. 25, 2011

(65) Prior Publication Data

US 2012/0057375 A1 Mar. 8, 2012

Related U.S. Application Data

(60) Provisional application No. 61/380,378, filed on Sep. 7, 2010.

(51) Int. Cl.
*H02M 3/335* (2006.01)

(52) U.S. Cl.
USPC .................................. 363/21.13; 363/21.15

(58) Field of Classification Search
USPC ......... 363/20, 21.01, 21.12, 21.13, 21.15, 95, 363/97, 131
See application file for complete search history.

(56) References Cited

U.S. PATENT DOCUMENTS

| | | | |
|---|---|---|---|
| 6,977,824 B1 | 12/2005 | Yang et al. | |
| 7,016,204 B2 | 3/2006 | Yang et al. | |
| 7,054,170 B2 * | 5/2006 | Yang et al. | 363/21.18 |
| 7,310,251 B2 * | 12/2007 | Yang et al. | 363/56.09 |
| 7,349,229 B1 | 3/2008 | Yang | |
| 7,414,865 B2 * | 8/2008 | Yang | 363/21.16 |
| 7,486,528 B2 | 2/2009 | Yang | |
| 7,492,613 B2 * | 2/2009 | Yang et al. | 363/21.01 |
| 7,616,461 B2 | 11/2009 | Yang et al. | |
| 7,671,578 B2 | 3/2010 | Li et al. | |
| 8,054,656 B2 * | 11/2011 | Su et al. | 363/21.15 |
| 8,094,468 B2 * | 1/2012 | Yang et al. | 363/21.18 |
| 8,213,192 B2 * | 7/2012 | Konecny et al. | 363/21.13 |
| 8,259,472 B2 * | 9/2012 | Li et al. | 363/21.12 |
| 8,305,001 B2 * | 11/2012 | Horiuchi et al. | 315/219 |
| 2009/0257251 A1 * | 10/2009 | Su et al. | 363/21.15 |
| 2010/0195355 A1 * | 8/2010 | Zheng | 363/21.12 |
| 2010/0308733 A1 * | 12/2010 | Shao | 315/119 |

* cited by examiner

*Primary Examiner* — Adolf Berhane

(74) *Attorney, Agent, or Firm* — Rosenberg, Klein & Lee

(57) ABSTRACT

A control circuit of a power converter according to the present invention comprises an output circuit, at least one input circuit and an input-voltage detection circuit. The output circuit generates a switching signal for regulating an output of the power converter in response to at least one feedback signal. The switching signal is coupled to switch a transformer of the power converter. The input circuit samples at least one input signal for generating the feedback signal. The input signal is correlated to the output of the power converter. The input-voltage detection circuit generates an input-voltage signal in response to the level of the an input voltage of the power converter. The input circuit will not sample the input signal when the input-voltage signal is lower than a threshold. The control circuit can eliminate the need of the input capacitor for improving the reliability of the power converter.

16 Claims, 4 Drawing Sheets

US 8,593,833 B2

METHOD AND APPARATUS FOR A FLYBACK POWER CONVERTER PROVIDING OUTPUT VOLTAGE AND CURRENT REGULATION WITHOUT INPUT CAPACITOR

BACKGROUND OF THE INVENTION

1. Field of the Invention

The present invention relates to power converter, and more specifically, the present invention relates to the control circuit and control method for power converter providing output regulation without input capacitor.

2. Description of Related Art

Nowadays, various power converters have been widely used to provide a regulated output (output voltage and/or output current). The power converter has an input capacitor for the energy store. Normally, the input capacitor is an electrolytic capacitor that is bulky and low reliability. Furthermore, without using a high value of input capacitor, the power factor (PF) of the power converter can be improved. Therefore, one of the objects of present invention is to eliminate the need of the input capacitor for improving the reliability of the power converter. Other objects of the present invention include improving the PF, reducing the size and the cost of the power converter.

FIG. 1 shows a prior art of a flyback power converter that has an input electrolytic capacitor 40 for the energy store. As shown in FIG. 1, the conventional flyback power converter includes a rectifier 12. The rectifier 12 receives an input line voltage $V_{AC}$ and rectifies the input line voltage $V_{AC}$. The input electrolytic capacitor 40 is coupled to an output terminal of the rectifier 12 for the energy store. A voltage $V_{DC}$ is provided by the input electrolytic capacitor 40. A transformer 10 has a primary winding $N_P$, a secondary winding $N_S$ and an auxiliary winding $N_A$.

A terminal of the primary winding $N_P$ is coupled to receive the voltage $V_{DC}$. Another terminal of the primary winding $N_P$ is coupled to a transistor 20. The transistor 20 is utilized to switch the transformer 10. A terminal of the secondary winding $N_S$ is coupled to a terminal of a rectifier 60. An output capacitor 65 is connected in between another terminal of the rectifier 60 and another terminal of the secondary winding $N_S$ for providing an output voltage $V_O$ to a load 70. The load 70 and the output capacitor 65 are connected in parallel.

A terminal of the auxiliary winding $N_A$ is coupled to a voltage divider. The voltage divider has resistors 51 and 52. The resistors 51 and 52 are connected in series. The voltage divider generates a voltage-sense signal $V_S$. The resistor 52 is further coupled to the ground. A switching controller 50 is coupled to a joint point of the resistors 51 and 52 for receiving the voltage-sense signal V. The switching controller 50 generates a switching signal SW. The switching signal SW controls the transistor 20 to switch the transformer 10 for regulating an output (output current $I_O$ and/or the output voltage $V_O$) of the power converter. When the transistor 20 is turned on, a switching current $I_P$ will flow through the transformer 10. Through a resistor 30, the switching current $I_P$ further generates a current-sense signal $V_{CS}$. The current-sense signal $V_{CS}$ is coupled to the switching controller 50.

The waveforms of the input line voltage $V_{AC}$ and the voltage $V_{DC}$ are shown in FIG. 2. The voltage $V_{DC}$ is the voltage on the input electrolytic capacitor 40. The minimum voltage of the voltage $V_{DC}$ maintains the power converter operated properly. A low voltage of the voltage $V_{DC}$ may cause the feedback open loop of the power converter. The output voltage $V_O$ of the flyback power converter can be expressed as, $$V_O = N \times V_{DC} \times \frac{T_{ON}}{T - T_{ON}} \qquad (1)$$

where the N is turn ratio of the transformer 10 ($N=N_S/N_P$; $N_P$ is the primary winding, $N_S$ is the secondary winding); the $V_{DC}$ is the voltage provided to the transformer 10; $T_{ON}$ is the on-time of the transistor 20; T is the switching period of the transistor 20.

In order to achieve a stable feedback loop for the power converter and prevent the transformer saturation, the maximum duty cycle "$T_{ON}/T$" is limited, such as <80% in general. If the voltage $V_{DC}$ is too low, the maximum on-time $T_{ON}$ will be unable to maintain the regulated output voltage $V_O$ (shown in equation (1)), which will cause the feedback open loop. When the feedback loop is significantly on/off in response to the change of the input line voltage $V_{AC}$, an overshoot and/or undershoot signal can be easily generated at the output of the power converter.

SUMMARY OF THE INVENTION

It is an objective of the present invention to provide a control circuit and a control method for power converter. It can eliminate the need of the input capacitor for improving the reliability of the power converter.

It is an objective of the present invention to provide a control circuit and a control method for power converter. It can control the power converter to provide output regulation without input capacitor for improving the power factor, reducing the size and the cost of the power converter.

The present invention provides a control circuit and a control method for power converter to provide the output regulation without input capacitor. The control circuit according to the present invention comprises an output circuit, at least one input circuit and an input-voltage detection circuit. The output circuit generates a switching signal for regulating an output of the power converter in response to at least one feedback signal. The switching signal is coupled to switch a transformer of the power converter. The input circuit samples at least one input signal for generating the feedback signal. The input signal is correlated to the output of the power converter. The input-voltage detection circuit generates an input-voltage signal in response to the level of an input voltage of the power converter. The input circuit will not sample the input signal when the input-voltage signal is lower than a threshold.

BRIEF DESCRIPTION OF THE DRAWINGS

The invention can be more fully understood by reading the subsequent detailed description and examples with references made to the accompanying drawings, wherein.

DESCRIPTION OF THE PREFERRED EMBODIMENTS

The following description is of the best-contemplated mode of carrying out the invention. This description is made for the purpose of illustrating the general principles of the invention and should not be taken in a limiting sense. The scope of the invention is best determined by reference to the appended claims.

Figure 3:
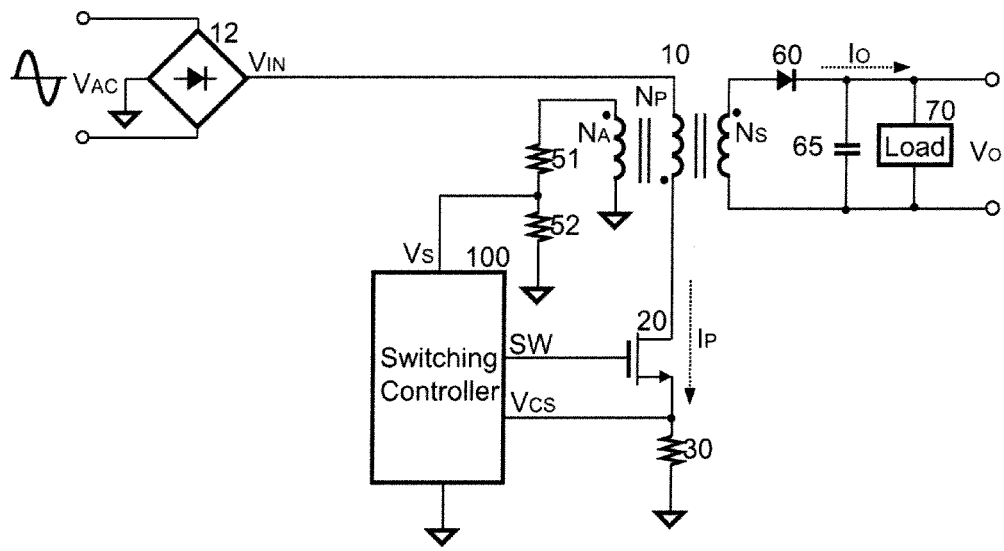
FIG. 3 shows a schematic circuit diagram of an embodiment of the flyback power converter according to the present invention.

FIG. 3 is a flyback power converter of a preferred embodiment of the present invention. The detail description of the primary-side controlled flyback power converter can be found in the prior arts of "Control circuit for controlling output current at the primary side of a power converter", U.S. Pat. No. 6,977,824; "Close-loop PWM controller for primary-side controlled power converters", U.S. Pat. No. 7,016,204; "Causal sampling circuit for measuring reflected voltage and demagnetizing time of transformer", U.S. Pat. No. 7,349,229; and "Linear-predict sampling for measuring demagnetized voltage of transformer", U.S. Pat. No. 7,486,528.

Figure 1:
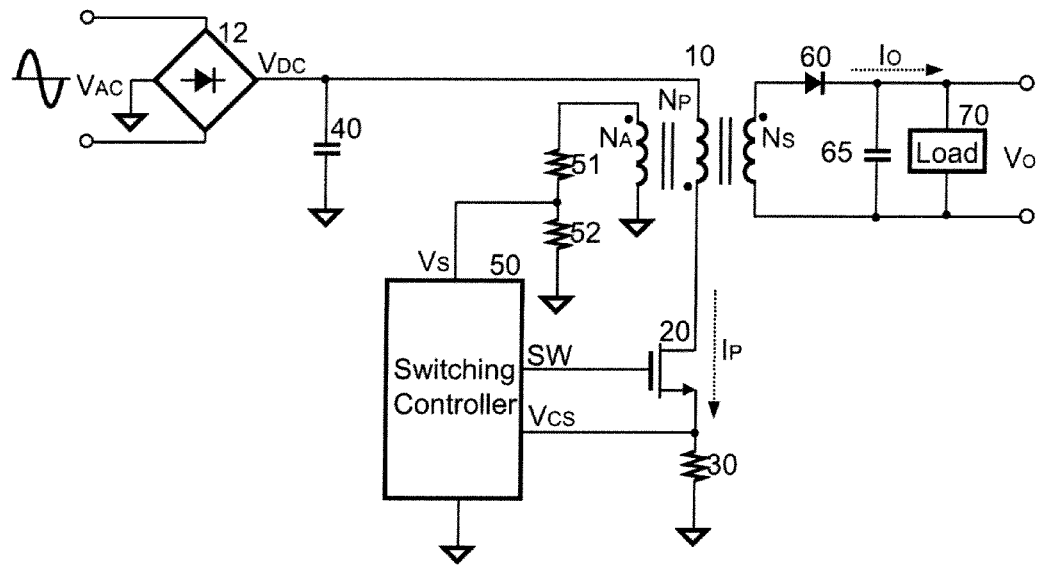
FIG. 1 shows a schematic circuit diagram of the conventional flyback power converter with an input electrolytic capacitor.
Figure 2:
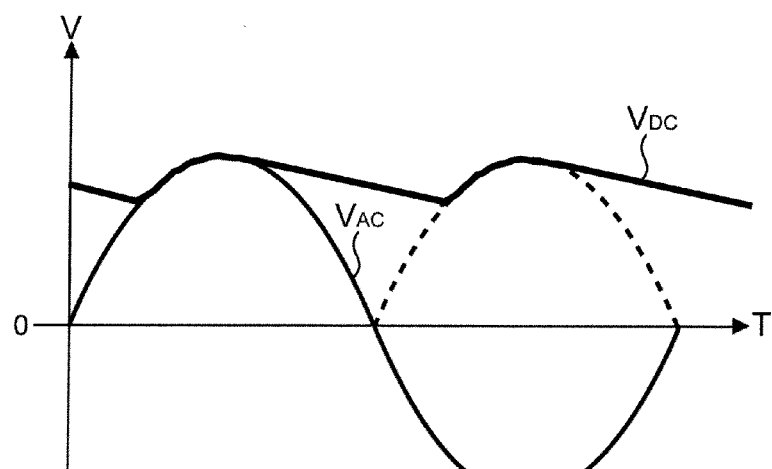
FIG. 2 shows waveforms of the input line voltage $V_{AC}$ and the voltage $V_{DC}$ of the conventional flyback power converter.

As shown in FIG. 3, the flyback power converter of this embodiment of the present invention is almost the same as the conventional flyback power converter (as shown in FIG. 1) except for the switching controller 100 and this embodiment doesn't need the input electrolytic capacitor 40 (as shown in FIG. 1). The transformer 10 includes the primary winding $N_P$, the auxiliary winding $N_A$ and the secondary winding $N_S$. The primary winding $N_P$ is coupled to receive an input voltage $V_{IN}$. The rectifier 12 receives the input line voltage $V_{AC}$ and rectifies the input line voltage $V_{AC}$ for generating the input voltage $V_{IN}$. Resistors 51 and 52 are connected to the auxiliary winding $N_A$ for generating a the voltage-sense signal $V_S$ coupled to the switching controller 100.

The voltage-sense signal $V_S$ is a voltage signal correlated to the output voltage $V_O$ and the level of the input voltage $V_{IN}$ of the power converter. The switching controller 100 is a control circuit that generates the switching signal SW. The switching signal SW is coupled to switch the transformer 10 through the transistor 20 for regulating an output (the output current $I_O$ and/or the output voltage $V_O$). The switching controller 100 is a primary-side controlled controller. The resistor 30 is connected in between the transistor 20 and the ground. When the transistor 20 is turned on, the switching current $I_P$ will flow through the transformer 10. Via the resistor 30, the switching current $I_P$ further generates the current-sense signal $V_{CS}$. The current-sense signal $V_{CS}$ is coupled to the switching controller 100. The switching current $I_P$ is a current signal and correlated to the output current $I_O$ and the input voltage $V_{IN}$ of the power converter. Therefore, the current-sense signal $V_{CS}$ represents the switching current $I_P$ and is correlated to the output current $I_O$ of the power converter.

Figure 4:
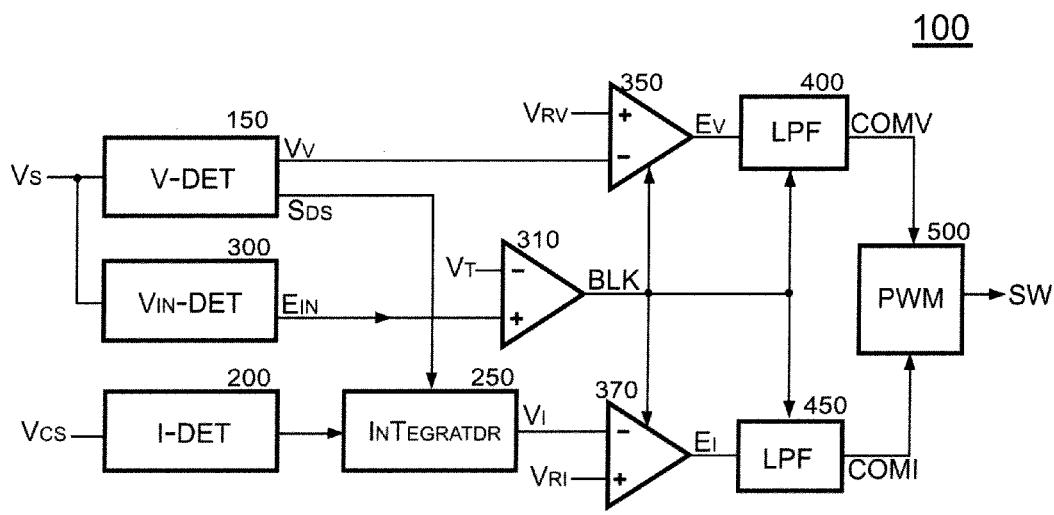
FIG. 4 shows a schematic circuit diagram of an embodiment of a switching controller of the flyback power converter according to the present invention.

FIG. 4 is a circuit diagram of a preferred embodiment of the switching controller 100. The switching controller 100 comprises a first input circuit and a second input circuit. The first input circuit includes a voltage-detection circuit (V-DET) 150, a first error amplifier 350 and a first low-pass filter (LPF) 400. The second input circuit includes a current-detection circuit (I-DET) 200, an integrator 250, a second error amplifier 370 and a second low-pass filter (LPF) 450.

The voltage-sense signal $V_S$ and the current-sense signal $V_{CS}$ are a first input signal and a second input signal provided to the voltage-detection circuit 150 and the current-detection circuit 200, respectively. The voltage-detection circuit 150 is coupled to receive the voltage-sense signal $V_S$ and sample the voltage-sense signal $V_S$ to generate a first feedback signal and a demagnetizing-time signal $S_{DS}$. The first feedback signal is a voltage-feedback signal $V_V$. The demagnetizing-time signal $S_{DS}$ is coupled to the integrator 250. The voltage-feedback signal $V_V$ is coupled to the first error amplifier 350 to generate a first amplified signal $E_V$ by comparing with a first reference signal $V_{RV}$. The first error amplifier 350 is used for developing a feedback loop. The first low-pass filter 400 is connected to the first amplified signal $E_V$ for a loop compensation (frequency compensation for the feedback loop) and generating a voltage-loop signal COMV. The detail description of the voltage-detection circuit 150 can be found in the prior arts, such as U.S. Pat. No. 7,016,204.

The current-detection circuit 200 is connected to the current-sense signal $V_{CS}$ to generate a second feedback signal through the integrator 250. The second feedback signal is a current-feedback signal $V_I$. The current-detection circuit 200 measures the current-sense signal $V_{CS}$ to generate a current-waveform signal. The integrator 250 integrates the current-waveform signal with the demagnetizing-time signal $S_{DS}$ for generating the current-feedback signal $V_I$. It means that the current-detection circuit 200 samples the current-sense signal $V_{CS}$ for generating the current-feedback signal $V_I$. The detail description of the current-detection circuit 200 and the integrator 250 can be found in the prior arts, such as U.S. Pat. No. 7,016,204.

The current-feedback signal $V_I$ is further coupled to the second error amplifier 370 to generate a second amplified signal $E_I$ by comparing with a second reference signal $V_{RI}$. The second error amplifier 370 is used for developing another feedback loop. The second low-pass filter 450 is connected to the second amplified signal $E_I$ for another loop compensation (frequency compensation for this feedback loop) and generating a current-loop signal COMI. Both the voltage-loop signal COMV and the current-loop signal COMI are coupled to a PWM circuit 500 to generate the switching signal SW.

The PWM circuit 500 is an output circuit that is utilized to generate the switching signal SW. The switching signal SW is coupled to switch the transformer 10 through the transistor 20 for regulating the output of the power converter. It is to say, the PWM circuit 500 generates the switching signal SW for regulating the output of the power converter in response to the voltage-feedback signal $V_V$ and the current-feedback signal $V_I$. The output of the power converter is the output voltage $V_O$ and/or the output current $I_O$ (as shown in FIG. 3).

The voltage-sense signal $V_S$ is further coupled to an input-voltage detection circuit 300 to generate an input-voltage signal $E_{IN}$. The voltage-sense signal $V_S$ is correlated to the input voltage $V_{IN}$ of the power converter. Therefore, the input-voltage detection circuit 300 generates the input-voltage signal $E_{IN}$ in response to the voltage level of the input voltage $V_{IN}$ of the power converter. Thus, the level of the input-voltage signal $E_{IN}$ is correlated to the voltage level of the input voltage $V_{IN}$ of the power converter. The input-voltage signal $E_{IN}$ is coupled to a comparator 310 to compare with a threshold $V_T$.

The comparator 310 will generate a blanking signal BLK (a low-true signal) when the input-voltage signal $E_{IN}$ is lower than the threshold $V_T$. The blanking signal BLK is coupled to the error amplifiers 350, 370 to stop the sampling of the voltage-feedback signal $V_V$ and/or the current-feedback signal $V_I$. It is like the input circuits stopping sampling the input signal (voltage-sense signal $V_S$ and/or the current-sense signal $V_{CS}$) when the input-voltage signal $E_{IN}$ is lower than the threshold $V_T$. The blanking signal BLK is further coupled to the low-pass filters 400, 450 to inhibit the sampling of the amplified signals $E_V$ and/or $E_I$.

Figure 5:
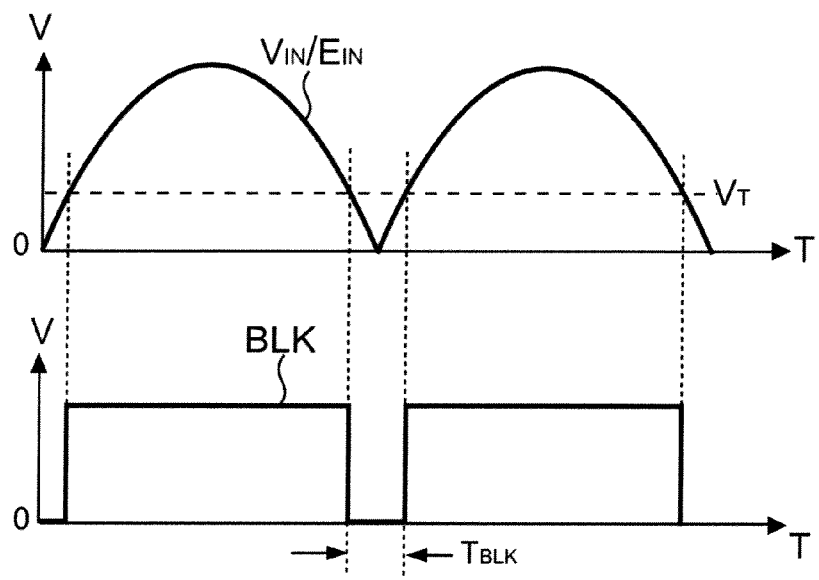
FIG. 5 shows waveform of the blanking signal BLK in response to the input voltage $V_{IN}$ and the input-voltage signal $E_{IN}$ according to the present invention.

FIG. 5 shows the waveform of the blanking signal BLK in response to the input voltage $V_{IN}$ and the input-voltage signal $E_{IN}$. The blanking signal BLK (a low-true signal) is generated when the input-voltage signal $E_{IN}$ is lower than the threshold $V_T$.

Figure 6:
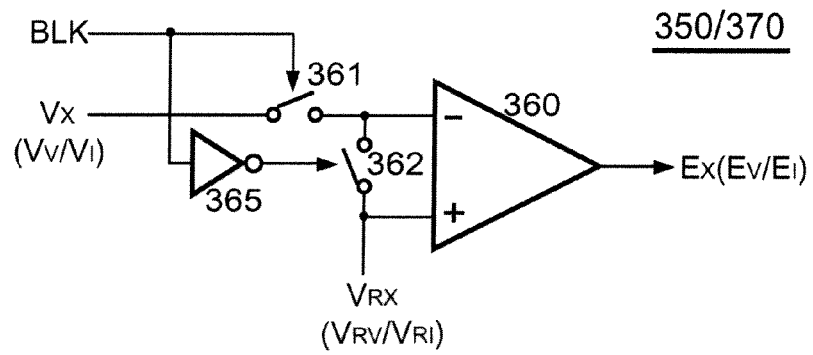
FIG. 6 shows a schematic circuit diagram of an embodiment of the error amplifier of the switching controller according to the present invention.

FIG. 6 shows a preferred circuit schematic of the error amplifiers 350, 370. The error amplifiers 350, 370 are used for error-amplifying the feedback signal $V_X$, such as the voltage-feedback signal $V_V$ or the current-feedback signal $V_I$, and stopping the error-amplifying when the input-voltage signal $E_{IN}$ is lower than the threshold $V_T$. An operational amplifier 360 is a transconductance amplifier that is used for generating the amplified signal $E_X$, such as the first amplified signal $E_V$ or second amplified signal $E_I$.

A switch 361 is coupled to receive the feedback signal $V_X$, such as the voltage-feedback signal $V_V$ or the current-feedback signal $V_I$, and connected to the negative-input of the operational amplifier 360. A reference signal $V_{RX}$ (e.g. the first reference signal $V_{RV}$ or the second reference signal $V_{RI}$) is connected to the positive-input of the operational amplifier 360. A switch 362 is coupled in between the positive-input and the negative-input of the operational amplifier 360. The blanking signal BLK is coupled to control the switch 361. Through an inverter 365, the blanking signal BLK is coupled to control the switch 362. Therefore, the negative-input of the operational amplifier 360 is connected to the feedback signal $V_X$ normally.

For the transconductance amplifier, it is no current output and high impedance when the inputs of the transconductance amplifier are short circuit. Therefore, when the blanking signal BLK is enabled (logical low level), the negative-input and the positive-input of the operational amplifier 360 are short circuit and are connected to the reference signal $V_{RX}$ due to the switch 361 is turned off and the switch 362 is turned on. Therefore, the error amplifiers 350, 370 are disconnected with the feedback signal $V_X$. It is like the error amplifiers 350, 370 stopping the error-amplifying when the input-voltage signal $E_{IN}$ is lower than the threshold $V_T$.

Figure 7:
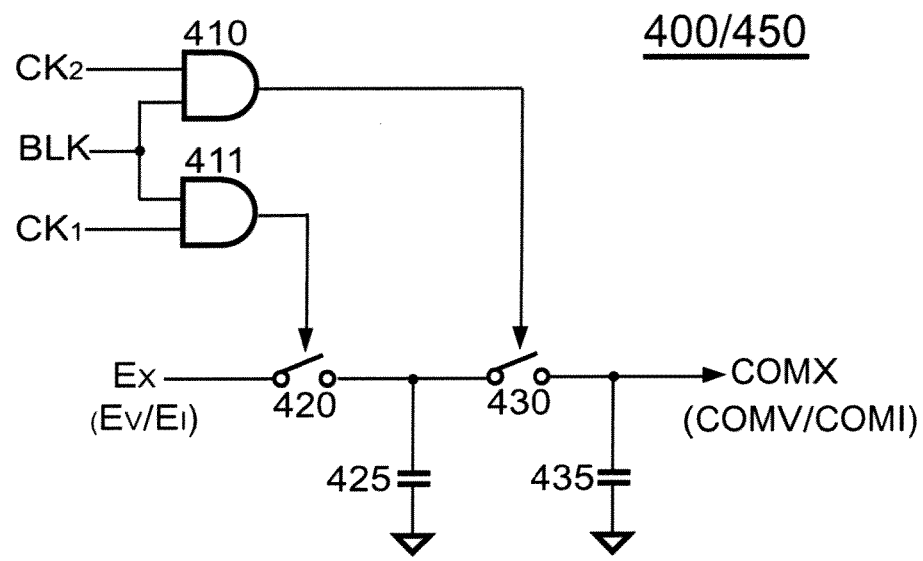
FIG. 7 shows a schematic circuit diagram of an embodiment of the low-pass filter of the switching controller according to the present invention.

FIG. 7 is a preferred circuit schematic of the low-pass filters 400, 450. The low-pass filters 400, 450 are used for low-pass filtering. The low-pass filtering is hold in the previous state when the input-voltage signal $E_{IN}$ is lower than the threshold $V_T$. It includes switches 420, 430 and capacitors 425, 435 to develop a low-pass switching filter for the loop compensation. One terminal of the switch 420 is couple to receive the amplified signal $E_X$, such as the first amplified signal $E_V$ or the second amplified signal $E_I$. The capacitor 425 is coupled in between another terminal of the switch 420 and the ground. The switch 430 is coupled in between the capacitor 425 and the capacitor 435. The capacitor 435 generates the loop signal COMX, such as the voltage-loop signal COMV or the current-loop signal COMI.

Clocking signals $CK_1$ and $CK_2$ are coupled to an input of AND gates 410 and 411 respectively. The blanking signal BLK is coupled to another inputs of the AND gates 410 and 411. Output of the AND gate 411 controls the switch 420 for sampling the amplified signal E to the capacitor 425. Output of the AND gate 410 controls the switch 430 for sampling the signal stored on the capacitor 425 to the capacitor 435 for generating the loop signal COMX.

The clocking signals $CK_1$ and $CK_2$ are coupled to control the switching of the switches 420 and 430 through the AND gates 410 and 411, in which the blanking signal BLK is coupled to turn off the switches 420 and 430 through the AND gates 410 and 411. Therefore, the signals on the capacitors 425 and 435 will be hold at the previous state once the blanking signal BLK is enabled.

In accordance with the present invention, the feedback loops of the power converter will be hold at the previous state once the input voltage $V_{IN}$ is lower than the threshold $V_T$. Thus, the feedback loops can be maintained as stable and without the overshoot and undershoot phenomena.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control circuit of a power converter comprising:
an output circuit generating a switching signal for regulating an output of the power converter in response to at least one feedback signal, in which the switching signal is coupled to switch a transformer;
at least one input circuit coupled to sample at least one input signal for generating the feedback signal; and
an input-voltage detection circuit coupled to generate an input-voltage signal in response to the level of an input voltage of the power converter;
wherein the input signal is correlated to the output of the power converter; the input circuit will not sample the input signal when the input-voltage signal is lower than a threshold.

2. The control circuit as claimed in claim 1, wherein the output of the power converter is an output voltage.

3. The control circuit as claimed in claim 2, wherein the input signal is a voltage signal correlated to the output voltage of the power converter.

4. The control circuit as claimed in claim 1, wherein the output of the power converter is an output current.

5. The control circuit as claimed in claim 4, wherein the input signal is a current signal correlated to the output current of the power converter.

6. The control circuit as claimed in claim 1, wherein the input circuit further comprises an error amplifier for developing a feedback loop, the error amplifier is disconnected when the input-voltage signal is lower than the threshold.

7. The control circuit as claimed in claim 1, wherein the input circuit further comprises a low-pass filter for a loop compensation, the low-pass filter is hold in the previous state when the input-voltage signal is lower than the threshold.

8. The control circuit as claimed in claim 1 is a primary-side controlled controller.

9. The control circuit as claimed in claim 1, further comprising a comparator for comparing the input-voltage signal with the threshold, in which the comparator generates a blanking signal to stop the input circuit sampling the input signal when the input-voltage signal is lower than the threshold.

10. The control circuit as claimed in claim 1, wherein the input circuit comprises:
a voltage-detection circuit sampling a first input signal to generate a first feedback signal, the first input signal being a voltage-sense signal and the first feedback signal being a voltage-feedback signal;

a first error amplifier comparing the voltage-feedback signal with a first reference signal to generate a first amplified signal;

a first low-pass filter generating a voltage-loop signal in response to the first amplified signal;

a current-detection circuit generating a second feedback signal in response to a second input signal, the second input signal being a current-sense signal and the second feedback signal being a current-feedback signal;

a second error amplifier comparing the current-feedback signal with a second reference signal to generate a second amplified signal; and a second low-pass filter generating a current-loop signal in response to the second amplified signal;

wherein the output circuit generates the switching signal in response to the voltage-loop signal and the current-loop signal, the first error amplifier and the second error amplifier are disconnected when the input-voltage signal is lower than the threshold, the first low-pass filter and the second low-pass filter are hold in the previous state when the input-voltage signal is lower than the threshold.

11. A method for controlling a power converter comprising:

generating a switching signal for regulating an output of the power converter in response to at least one feedback signal, in which the switching signal is coupled to switch a transformer;

sampling at least one input signal for generating the feedback signal, in which the input signal is correlated to the output of the power converter;

generating an input-voltage signal in response to the level of an input voltage of the power converter; and stopping the sample of the input signal when the input-voltage signal being lower than a threshold.

12. The method as claimed in claim 11, wherein the output of the power converter is an output voltage and/or an output current.

13. The method as claimed in claim 12, wherein the input signal is a voltage signal correlated to the output voltage of the power converter or a current signal correlated to the output current of the power converter.

14. The method as claimed in claim 11, further comprising an error-amplifying the feedback signal, in which the error-amplifying is stopped when the input-voltage signal is lower than the threshold.

15. The method as claimed in claim 11, further comprising a low-pass filtering for the loop compensation, in which the low-pass filtering is hold in the previous state when the input-voltage signal is lower than the threshold.

16. The method for controlling the power converter as claimed in claim 11 is a primary-side controlled method.

* * * * *